United States Patent
Sukhomlinov et al.

(10) Patent No.: US 9,846,652 B2
(45) Date of Patent: Dec. 19, 2017

(54) TECHNOLOGIES FOR REGION-BIASED CACHE MANAGEMENT

(71) Applicant: Intel Corporation, Santa Clara, CA (US)

(72) Inventors: Vadim Sukhomlinov, Santa Clara, CA (US); Kshitij A. Doshi, Chandler, AZ (US); Namakkal N. Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/087,162

(22) Filed: Mar. 31, 2016

(65) Prior Publication Data

US 2017/0286310 A1 Oct. 5, 2017

(51) Int. Cl.
*G06F 12/08* (2016.01)
*G06F 12/0891* (2016.01)
*G06F 12/0893* (2016.01)

(52) U.S. Cl.
CPC ...... *G06F 12/0891* (2013.01); *G06F 12/0893* (2013.01); *G06F 2212/604* (2013.01); *G06F 2212/69* (2013.01)

(58) Field of Classification Search
CPC .................................................. G06F 9/3848
See application file for complete search history.

(56) References Cited

U.S. PATENT DOCUMENTS

| 6,448,840 B2* | 9/2002 | Kao | H01L 27/0222 |
| | | | 327/156 |
| 7,915,951 B1* | 3/2011 | Jurasek | G05F 1/46 |
| | | | 327/538 |
| 2001/0025292 A1* | 9/2001 | Denk | G06F 7/48 |
| | | | 708/550 |

* cited by examiner

*Primary Examiner* — Yong Choe
(74) *Attorney, Agent, or Firm* — Barnes & Thornburg LLP

(57) ABSTRACT

Technologies for region-based cache management includes network computing device. The network computing device is configured to divide an allocated portion main memory of the network computing device into a plurality of memory regions, each memory region having a cache block that includes a plurality of cache lines of a cache memory of the processor. The network computing device is further configured to determine whether a cache line selected for eviction from the cache memory corresponds to one of the plurality of memory regions and, if so, retrieve a dynamically adjustable bias value (i.e., a fractional probability) associated with the corresponding memory region. Additionally, the network computing device is configured to generate a bias comparator value for the corresponding memory region, compare the bias value of the corresponding memory region and the bias comparator value generated for the corresponding memory region, and determine whether to evict the cache line based on the comparison. Other embodiments are described herein.

30 Claims, 6 Drawing Sheets

US 9,846,652 B2

TECHNOLOGIES FOR REGION-BIASED CACHE MANAGEMENT

BACKGROUND

Network operators and communication service providers typically rely on various network virtualization technologies to manage complex, large-scale data centers, which may include a multitude of network computing devices (e.g., servers, switches, routers, etc.) to process network traffic through the data center. For example, network operators and service provider networks may rely on network function virtualization (NFV) deployments to deploy network services (e.g., firewall services, network address translation (NAT) services, deep packet inspection (DPI) services, evolved packet core (EPC) services, mobility management entity (MME) services, packet data network gateway (PGW) services, serving gateway (SGW) services, billing services, transmission control protocol (TCP) optimization services, etc.). To provide scalability to meet network traffic processing demands and reduce operational costs, virtual network functions (VNFs) are typically employed to handle specific network function operations. Such operations are typically run on one or more virtual machines (VMs) in a virtualized environment on top of the hardware networking infrastructure.

Data flows occurring between such VNFs (i.e., inter-VNF flows) are commonly optimized by inter-VM shared memory (IVSHMEM), relying on cache memory to provide critical speed advantages. However, latency can vary unpredictably under multi-VM consolidation, which is common in NFV deployments. Accordingly, development of interfacing applications generally requires careful design to ensure that critical accesses will be cache supported. However, in embodiments in which multiple VNFs are deployed and each VNF relies on one or more VMs sharing the same cache, minimizing the impact of one VM on the other VMs can be difficult to achieve.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
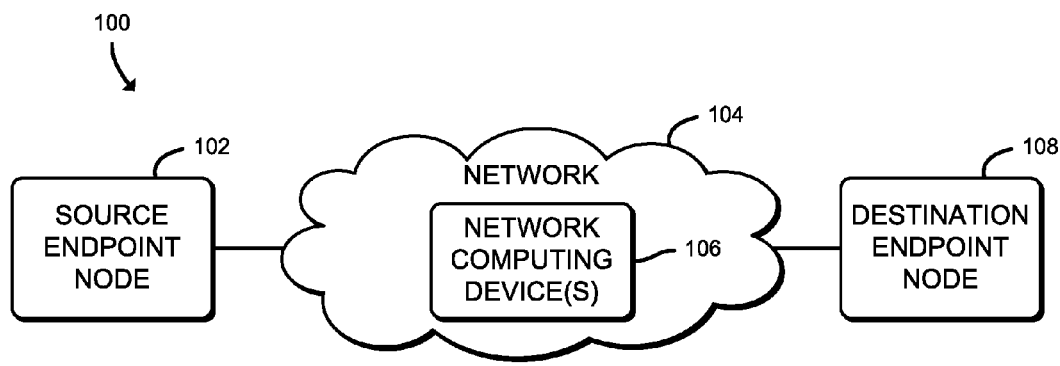
FIG. 1 is a simplified block diagram of at least one embodiment of a system for region-based cache management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for region-based cache management includes a source endpoint node 102 communicatively coupled to a destination endpoint node 108 via a network computing device 106 of a network 104. The network computing device 106 is configured to perform various operations (e.g., services) on network traffic (i.e., network packets, messages, etc.) received at the network computing device 106. Such network traffic may be received from the source endpoint node 102, the destination endpoint node 108, or another network computing device 106. Accordingly, while only a single network computing device 106 is shown in the network 104 of the illustrative system 100, it should be appreciated that the network 104 may include more than one network computing device 106 coupled and configured in various architectures.

Illustratively, the network computing device 106 is configured to process a network packet to determine whether to drop or forward a network packet. To process the network packet, any number of services, or network functions, may be performed on the network packet, such as firewall services, network address translation (NAT) services, deep packet inspection (DPI) services, evolved packet core (EPC) services, mobility management entity (MME) services, packet data network gateway (PGW) services, serving gateway (SGW) services, billing services, transmission control protocol (TCP) optimization services, etc. In some embodiments, the network functions may be run using one or more virtual machines (VMs) (e.g., in a service function chain), native applications, or applications running in containers (e.g., Docker). For example, the network computing device 106 may be configured to run the services via a number of virtual network functions (VNFs) using one or more VMs. As such, it should be appreciated that in such embodiments the network computing device 106 is configured to map virtual representations of physical components of the network computing device 106 to virtualized components of the various VMs and/or applications, such that inter-VNF/application data flow can be managed across VMs (e.g., across VMs in a service function chain).

Unlike present technologies directed toward cache memory control and processor core allocation (e.g., Cache Allocation Technology (CAT)) which prioritize cache on behalf of VMs and/or processes, and similarly unlike present technologies directed toward input/output data flow into and out of the processor cache (e.g., Data Direct I/O (DDIO)) which prioritize cache based on devices (e.g., Peripheral Component Interconnect Express (PCI-e) network interface controllers (NICs), solid state drives (SSDs), etc.), the region-based cache management employed by the network computing device 106 prioritizes and customizes both caching and cache coherence on the basis of physical memory ranges.

In use, network computing device 106 adjusts an existing cache policy for a defined memory buffer corresponding to a particular portion of physical memory to favor use of a region-based buffer on a per-application basis to preserve frequently used data in a particular cache region associated with the corresponding memory buffer. To do so, the network computing device 106 is configured to allocate a portion of physical memory and associate, or otherwise map, a block of cache memory to the allocated portion of physical memory, or a memory buffer associated therewith. The network computing device 106 then divides the allocated physical memory into multiple regions. As such, the block of corresponding cache memory is also divided into corresponding regions (i.e., cache regions), such as may be performed by mapping each cache region to the applicable divided portion of the allocated physical memory. The network computing device 106 further identifies to the applicable hardware those areas of the divided portions of physical memory that may benefit from differentiated cache treatment, such as the region-based cache management treatment as described herein. Accordingly, only data from an associated portion of physical memory, and the memory buffer associated therewith, can be stored in a particular block of cache memory, or cache region.

For example, in an embodiment wherein the network computing device 106 is to evict a cache line to load new data from memory, but the network computing device 106 has determined that memory is not mapped to a memory address associated with one of the region-mapped cache regions, the network computing device 106 may only use an unassociated portion of cache (i.e., common cache) in which to store the data. In other words, if the network computing device 106 determines that data to be loaded from memory is not associated with one of the region-based mapped portions of cache, the network computing device 106 may only load the data into a cache line from common cache (i.e., a non-region-based mapped portion of cache).

Alternatively, if the network computing device 106 determines that data to be loaded from memory is associated with one of the region-based mapped portions of cache, the network computing device 106 may select between a region-mapped cache regions and common cache. If the network computing device 106 selects to load the data into common cache, the network computing device 106 is configured to use the non-biased eviction policy in the event the cache line of the common cache is to be evicted or otherwise displaced. Alternatively, if the network computing device 106 selects to load the data into a region-based mapped portion of cache, the network computing device 106 is configured to use the biased eviction policy in the event the cache line of the common cache is to be evicted or otherwise displaced.

To identify the regions of the physical memory that may benefit from differentiated cache treatment, the network computing device 106 assigns each corresponding cache block region a region indicator and one or more configuration parameters, as may be based on a cache allocation of one or more contiguous physical memory ranges. The region indicator may be embodied as any type of data structure usable to identify a respective region of allocated memory. In an illustrative example, the network computing device 106 divides the allocated portion of physical memory into a first group used for sharing data (e.g., a shared region) between VM instances within a VNF, or across VNFs, and a second group used for transient data communications (e.g., a relay region) between producer and consumer VM instances within a VNF, or across VNFs.

Similarly, the network computing device 106 divides the cache blocks mapped to the corresponding physical memory regions. In such an embodiment, the network computing device 106 may use an architecturally exposed mechanism to specify which cache block region corresponds to which type of data (i.e., which type of data corresponds to which region). For example, the first group may be assigned a shared region indicator and the second group may be assigned a relay region indicator. Accordingly, the cache block region corresponding to the shared region (i.e., the first group) may be assigned the shared region indicator, and similarly, the cache block region corresponding to the relay region (i.e., the second group) may be assigned the region indicator.

In furtherance of the illustrative example, the network computing device 106 may additionally assign one or more configuration parameters to each cache block region (i.e., to the cache lines associated with each cache block region). The configuration parameters may include any data defining or otherwise characterizing a cache block region, such as the region indicators, memory range addresses, memory range offsets (e.g., a head offset, a tail offset, etc.), as well as any other characteristics associated with the cache block region. For example, the configuration parameters may include a head indicator and a tail indicator (e.g., stored as offsets in respective MSRs) in embodiments wherein a particular region (e.g., the shared region and/or the relay region) is treated by hardware and software of the network computing device 106 as if it were a circular buffer.

In some embodiments, the configuration parameters (e.g., the head and tail indicators) may be stored as offsets in respective MSRs. The cache characteristics additionally include a bias value (i.e., a value between zero and one) that corresponds to a fractional probability usable to determine whether to evict a particular cache line that has been selected for eviction. Accordingly, the bias value corresponding to a region of the cache block can be compared against a probabilistic result to determine whether to evict the cache line (i.e., evict the cache line or select another cache line for eviction). It should be appreciated that the probabilistic result may be determined from any known probabilistic determinable technique, such as a biased coin flip simulation or some other type of selection randomizing technique.

Figure 2:
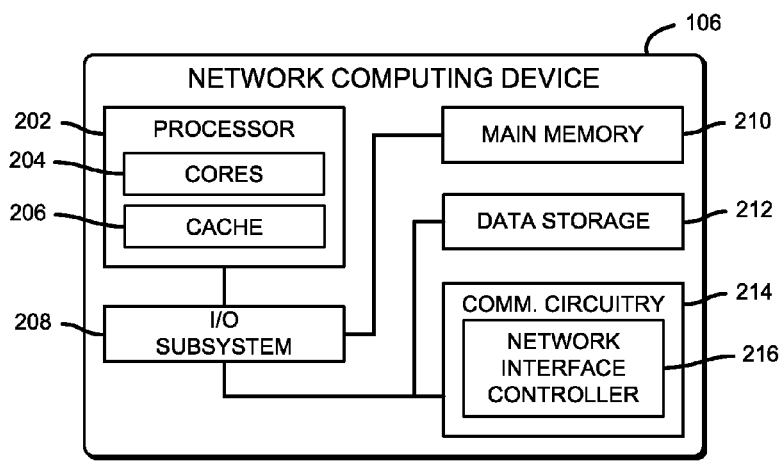
FIG. 2 is a simplified block diagram of at least one embodiment of the network computing device of the system of FIG. 1.

The network computing device 106 may be embodied as any type of network traffic processing device that is capable of performing the functions described herein, such as, without limitation, a server (e.g., stand-alone, rack-mounted, blade, etc.), a network appliance (e.g., physical or virtual), a switch (e.g., rack-mounted, standalone, fully managed, partially managed, full-duplex, and/or half-duplex communication mode enabled, etc.), a router, a web appliance, a distributed computing system, a processor-based system, and/or a multiprocessor system. As shown in FIG. 2, the illustrative network computing device 106 includes a processor 202, an input/output (I/O) subsystem 208, a main memory 210, a data storage device 212, and communication circuitry 214. Of course, the network computing device 106 may include other or additional components, such as those commonly found in a computing device, in other embodiments. Additionally, in some embodiments, one or more of the illustrative components may be incorporated in, or otherwise form a portion of, another component. For example, the main memory 210, or portions thereof, may be incorporated in the processor 202 in some embodiments. Further, in some embodiments, one or more of the illustrative components may be omitted from the network computing device 106.

The processor 202 may be embodied as any type of processor capable of performing the functions described herein, such as, but not limited to, a single physical multi-processor core chip, or package. The illustrative processor 202 includes a number of processor cores 204, each embodied as an independent logical execution unit capable of executing programmed instructions. It should be appreciated that, in some embodiments of the network computing device 106 (e.g., supercomputers), the network computing device 106 may include thousands of processor cores 204. The processor 202 may be connected to a physical connector, or socket, on a motherboard (not shown) of the network computing device 106 configured to accept a single physical processor package (i.e., a multi-core physical integrated circuit).

The illustrative processor 202 additionally includes a cache memory 206, which may be embodied as any type of cache that the processor 202 can access more quickly than the main memory 210, such as an on-die cache, or on-processor cache. In other embodiments, the cache memory 206 may be an off-die cache, but reside on the same system-on-a-chip (SoC) as the processor 202. It should be appreciated that, in some embodiments, the cache memory 206 may have a multi-level architecture. In other words, in such multi-level architecture embodiments, the cache memory 206 may be embodied as an L1, L2, or L3 cache, for example. It should be further appreciated that, in some embodiments, the network computing device 106 may include more than one processor 202. In other words, in such embodiments, the network computing device 106 may include more than one physical processor package, each of which may be connected to a motherboard (not shown) of the network computing device 106 via an individual socket, each of which may be communicatively coupled to one or more independent hardware memory slots.

The main memory 210 is communicatively coupled to the processor 202 via the I/O subsystem 208, which may be embodied as circuitry and/or components to facilitate input/output operations with the processor 202, the main memory 210, and other components of the network computing device 106. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 202, the main memory 210, and other components of the network computing device 106, on a single integrated circuit chip.

The data storage device 212 may be embodied as any type of device or devices configured for short-term or long-term storage of data such as, for example, memory devices and circuits, memory cards, hard disk drives, solid-state drives, or other data storage devices. It should be appreciated that the data storage device 212 and/or the main memory 210 (e.g., the computer-readable storage media) may store various data as described herein, including operating systems, applications, programs, libraries, drivers, instructions, etc., capable of being executed by a processor (e.g., the processor 202) of the network computing device 106.

The communication circuitry 214 may be embodied as any communication circuit, device, or collection thereof, capable of enabling communications between the network computing device 106 and other computing devices (e.g., the source endpoint node 102, the destination endpoint node 108, another network computing device 106, etc.) over a network (e.g., the network 104). The communication circuitry 214 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 214 includes a network interface controller (NIC) 216. The NIC 216 may be embodied as one or more add-in-boards, daughtercards, network interface cards, controller chips, chipsets, or other devices that may be used by the network computing device 106. For example, in some embodiments, the NIC 216 may be integrated with the processor 202, embodied as an expansion card coupled to the I/O subsystem 208 over an expansion bus (e.g., PCI Express), part of a SoC that includes one or more processors, or included on a multichip package that also contains one or more processors. Additionally or alternatively, in some embodiments, functionality of the NIC 216 may be integrated into one or more components of the network computing device 106 at the board level, socket level, chip level, and/or other levels.

Referring again to FIG. 1, the source endpoint node 102 and/or the destination endpoint node 108 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system. Accordingly, the source endpoint node 102 and/or the destination endpoint node 108 may include like components to the components described in FIG. 2 of the illustrative network computing device, such as a processor, an I/O subsystem, a memory, a data storage device, and/or communication circuitry, which are not shown for clarity of the description. As such, the descriptions of the like components are not repeated herein with the understanding that the description of the corresponding components provided above in regard to the network computing device 106 applies equally to the corresponding components of the source endpoint node 102 and/or the destination endpoint node 108.

The network 104 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other computing devices (e.g., virtual and physical routers, switches, network hubs, servers, storage devices, compute devices, etc.), as needed to facilitate communication between the source endpoint node 102 and the destination endpoint node 108, as well as between network computing devices 106, which are not shown to preserve clarity of the description.

It should be further appreciated that, in some embodiments, the network 104 may include additional computing devices, such as a network controller (not shown) configured to provide one or more policies (e.g., network policies, cache eviction policies, security policies, etc.) or instructions to the network computing device 106. In such embodiments, the network controller may be a separate computing device communicatively coupled to the network computing device 106 that is configured to operate in a software-defined networking (SDN) environment (i.e., an SDN controller) and/or a network functions virtualization (NFV) environment (i.e., an NFV manager and network orchestrator (MANO)).

Figure 3:
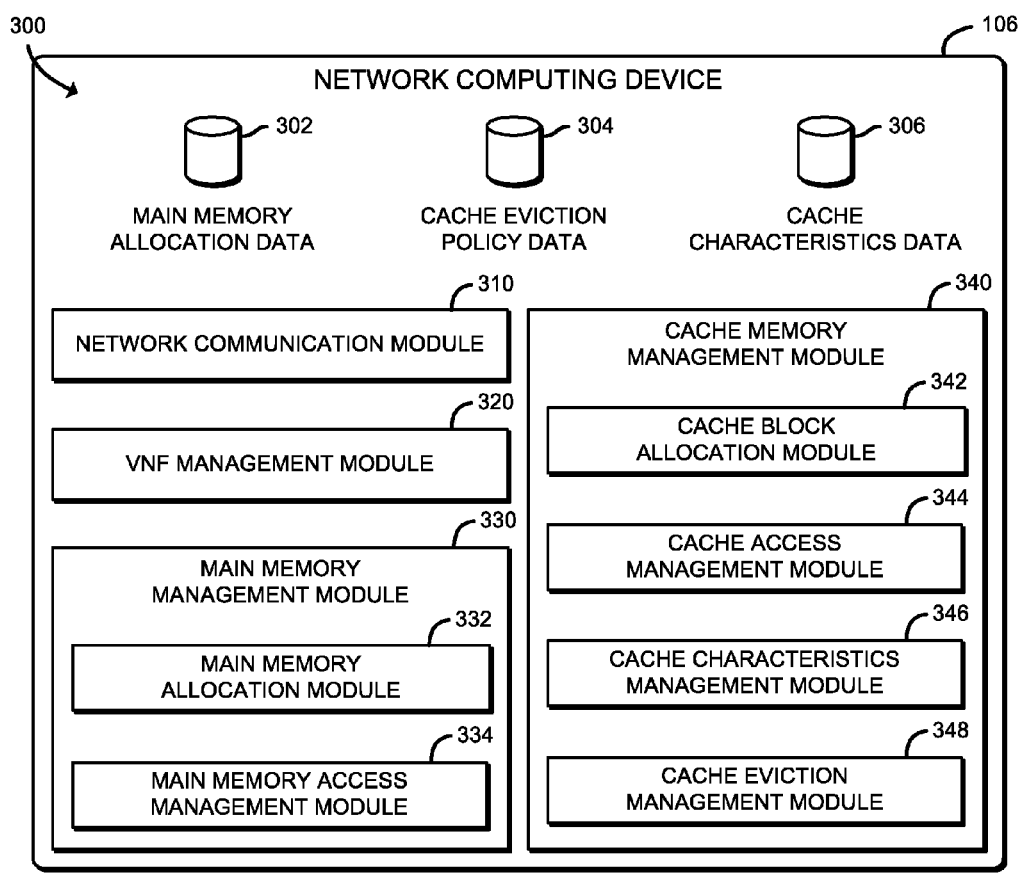
FIG. 3 is a simplified block diagram of at least one embodiment of an environment that may be established by the network computing device of FIG. 2.

Referring now to FIG. 3, in an illustrative embodiment, the network computing device 106 establishes an environment 300 during operation. The illustrative environment 300 includes a communication management module 310, a network function management module 320, a main memory management module 330, and a cache memory management module 340. The various modules of the environment 400 may be embodied as hardware, firmware, software, or a combination thereof. As such, in some embodiments, one or more of the modules of the environment 300 may be embodied as circuitry or collection of electrical devices (e.g., a communication management circuit 310, a network function management circuit 320, a main memory management circuit 330, a cache memory management circuit 340, etc.).

It should be appreciated that, in such embodiments, one or more of the communication management circuit 310, the network function management circuit 320, the main memory management circuit 330, and the cache memory management circuit 340 may form a portion of one or more of the processor 202, the I/O subsystem 208, the communication circuitry 214, and/or other components of the network computing device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 202 or other components of the network computing device 106.

In the illustrative environment 300, the network computing device 106 further includes main memory allocation data 302, cache eviction policy data 304, and cache characteristics data 306, each of which may be stored in the main memory 210 and/or the data storage device 212 of the network computing device 106. Further, each of the main memory allocation data 302, the cache eviction policy data 304, and/or the cache characteristics data 306 may be accessed by the various modules and/or sub-modules of the network computing device 106. Additionally, it should be appreciated that the data stored in, or otherwise represented by, each of the main memory allocation data 302, the cache eviction policy data 304, and/or the cache characteristics data 306 may not be mutually exclusive relative to each other in some embodiments.

For example, in some implementations, data stored in the main memory allocation data 302 may also be stored as a portion of the cache eviction policy data 304, and/or vice versa. As such, although the various data utilized by the network computing device 106 is described herein as particular discrete data, such data may be combined, aggregated, and/or otherwise form portions of a single or multiple data sets, including duplicative copies, in other embodiments. It should be further appreciated that the network computing device 106 may include additional and/or alternative components, sub-components, modules, sub-modules, and/or devices commonly found in a computing device, which are not illustrated in FIG. 3 for clarity of the description.

The communication management module 310, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the network computing device 106. To do so, the communication management module 310 is configured to receive and process network packets from other computing devices (e.g., the source endpoint node 102, the destination endpoint node 108, and/or other computing device(s) communicatively coupled to the network computing device 106, such as another network computing device 106). Additionally, the communication management module 310 is configured to prepare and transmit network packets to another computing device (e.g., t the source endpoint node 102, the destination endpoint node 108, and/or other computing device(s) communicatively coupled to the network computing device 106, such as another network computing device 106). Accordingly, in some embodiments, at least a portion of the functionality of the communication management module 310 may be performed by the communication circuitry 214 of the network computing device 106, or more specifically by the NIC 216 of the communication circuitry 214.

The network function management module 320, which may be embodied as hardware, firmware, software, virtualized hardware, emulated architecture, and/or a combination thereof as discussed above, is configured to manage the physical and virtual functions of the NIC and associated VMs and/or applications of the network computing device 106. Accordingly, in such embodiments wherein the virtual functions are associated with VMs (e.g., running VNFs), the network function management module 320 is additionally configured to manage the virtual functions (VFs) associated therewith (see, e.g., the VMs 402 and virtual functions 410 of FIG. 4). To do so, the network function management module 320 is configured to deploy (i.e., spin-up, perform instantiation, etc.) and close (i.e., wind-down, remove from the network, etc.) the VMs based on the various service functions (e.g., based on service functions of a service function chain corresponding to the network packet stream) to be performed on the network packets.

Accordingly, the network function management module 320 is further configured to manage each of the virtual function drivers associated with the respective VMs of each VNF, as well as manage the communications therebetween. In other words, the network function management module 320 is configured to direct the flow of data to the appropriate network functions and between the appropriate network functions. For example, the network function management module 320 is configured to determine an intended destination (e.g., a VM) for which data is to be directed (i.e., based on an access request) and direct the data to an interface of the intended destination (i.e., a virtual function of the VM).

Figure 5:
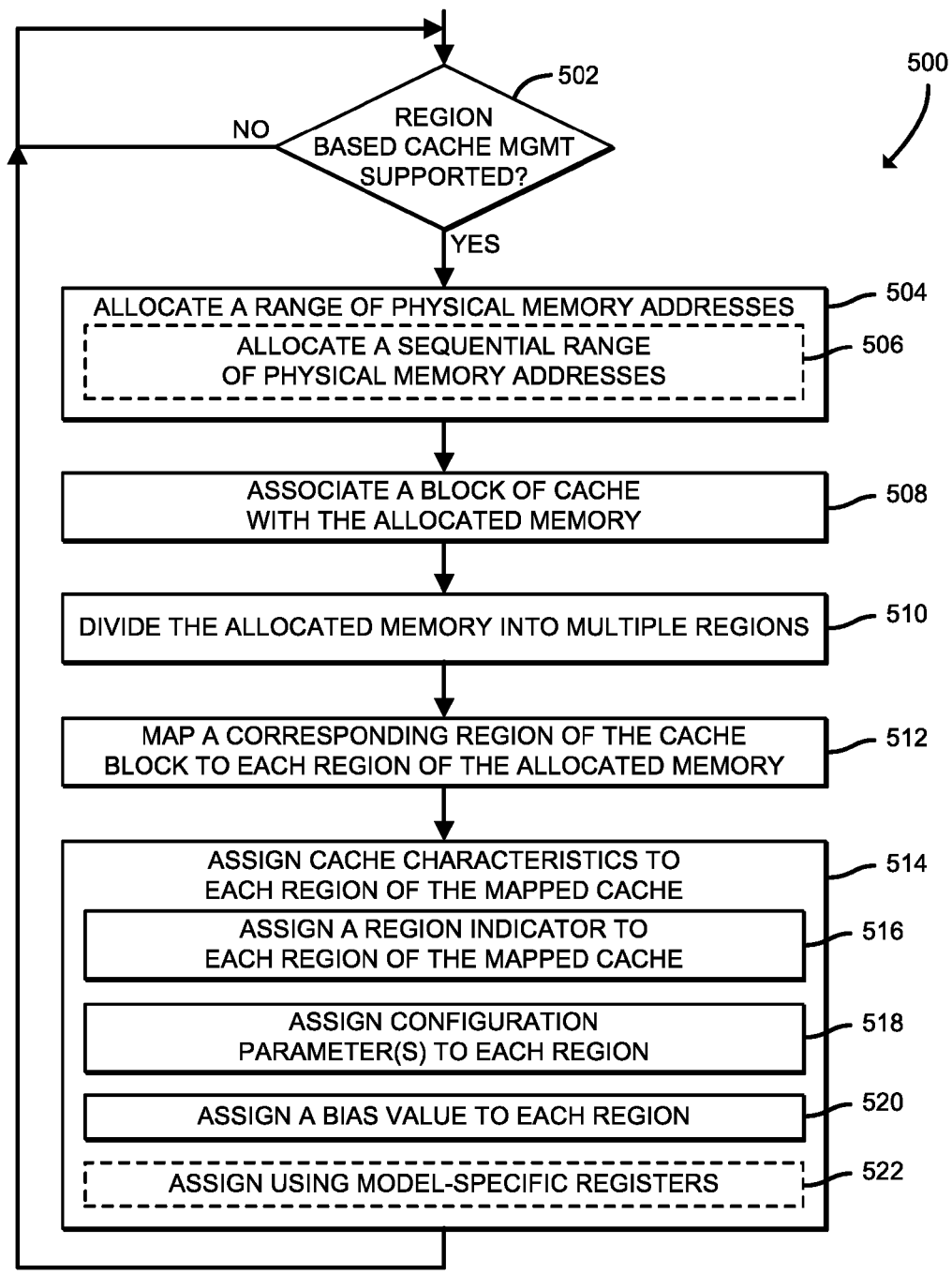
FIG. 5 is a simplified flow diagram of at least one embodiment of a method for configuring region-based cache blocks that may be executed by the network computing device of FIG. 2.

The main memory management module 330, which may be embodied as hardware, firmware, software, virtualized hardware, emulated architecture, and/or a combination thereof as discussed above, is configured to manage the allocation and designation of main memory (e.g., the main memory 210 of FIG. 2) of the network computing device 106 (see, e.g., the method 500 for configuring region-based cache blocks of FIG. 5). To do so, the illustrative main memory management module 330 includes a main memory allocation module 332 and a main memory access management module 334.

It should be appreciated that each of the main memory allocation module 332, the main memory access management module 334, and the relay region management module 336 of the main memory management module 330 may be separately embodied as hardware, firmware, software, virtualized hardware, emulated architecture, and/or a combination thereof. For example, the main memory allocation module 332 may be embodied as a hardware component, while the main memory access management module 334 is embodied as a virtualized hardware component or as some other combination of hardware, firmware, software, virtualized hardware, emulated architecture, and/or a combination thereof.

The main memory allocation module 332 is configured to allocate a range of physical memory address for region-based cache management. In some embodiments, the main memory allocation module 332 may be configured to allocate large, contiguous, physical memory address ranges. In an illustrative example, the main memory allocation module 332 may allocate a 1 GB hugepage for inter-VM shared memory (IVSHMEM). It should be appreciated that the main memory allocation module 332 may be configured to allocate more than one large, contiguous, physical memory address range at any given time. The main memory allocation module 332 is further configured to divide the allocated physical memory range into multiple regions, such as may be based on a number of regions for which to store certain types of data.

The main memory access management module 334 is configured to manage accesses (e.g., read, writes, etc.) to main memory. In other words, the main memory access management module 334 is configured to manage the flow of data to and from the main memory of the network computing device 106, such as the main memory 210 of FIG. 2. Accordingly, in some embodiments, the main memory access management module 334 may be configured to function, or otherwise be embodied as, a memory controller interface. In some embodiments, data related to the allocation of the main memory (e.g., memory addresses, allocation information, access logs, etc.) may be stored in the main memory allocation data 302.

The cache memory management module 340, which may be embodied as hardware, firmware, software, virtualized hardware, emulated architecture, and/or a combination thereof as discussed above, is configured to manage the allocation and designation of cache memory of the network computing device, such as the cache memory 206 of FIG. 2. To do so, the illustrative cache memory management module 340 includes a cache block allocation module 342, a cache access management module 344, a cache characteristics management module 346, and a cache eviction management module 348.

It should be appreciated that each of the cache block allocation module 342, the cache access management module 344, the cache characteristics management module 346, and the cache eviction management module 348 of the cache memory management module 340 may be separately embodied as hardware, firmware, software, virtualized hardware, emulated architecture, and/or a combination thereof. For example, the cache block allocation module 342 may be embodied as a hardware component, while the cache access management module 344 is embodied as a virtualized hardware component or as some other combination of hardware, firmware, software, virtualized hardware, emulated architecture, and/or a combination thereof.

The cache block allocation module 342 is configured to manage the allocation of cache memory into cache blocks. The cache block allocation module 342 is additionally configured to manage the mapping of the cache blocks to portions of physical memory (e.g., the main memory 210 of FIG. 2) of the network computing device 106. For example, as described previously, the network computing device 106 is configured to divide allocated portions of main memory based on a number of designated regions. In furtherance of the example, the cache blocks associated with the allocated main memory are similarly designated for those regions, such as may be identified by a region indicator that may be maintained by the cache characteristics management module 346. As such, the cache block allocation module 342 is configured to map the divided portions of the cache block to the regions of the allocated portion of physical memory.

The cache access management module 344 is configured to manage the accesses (e.g., read, writes, etc.) to cache memory. In other words, the cache access management module 344 is configured to manage the flow of data to and from the cache memory of the network computing device 106, such as the cache memory 206 of FIG. 2. Accordingly, the cache access management module 344 may be configured to interface with the cache eviction management module 348 upon determining a cache line needs to be made available for storing alternative data.

The cache characteristics management module 346 is configured to manage the characteristics of each cache block, such as region indicators and any configuration parameters associated therewith. In some embodiments, the region indicators and/or configuration parameters may be stored in an architecturally exposed mechanism, such as one or more model-specific registers (MSRs). For example, in an embodiment wherein the cache block has been divided into three regions including a non-region specified portion, a shared region (e.g., for sharing data between entities), and a relay region (e.g., for memory-based communication channels that butter data in transit from producers to consumers), the cache characteristics management module 346 is configured to maintain corresponding indicators for each divided portion of the cache block. In furtherance of the previous example, the cache characteristics management module 346 may be configured to assign a shared region indicator to the shared region and relay region indicator to the relay region.

The cache characteristics management module 346 is further configured to manage a bias value associated with each region-based portion of physical memory and the applicable portion of the cache block mapped to the respective region-based portion of the physical memory. The bias value effects a bias for keeping cache lines associated with that bias value's corresponding region from being evicted in relative preference to the other cache lines (e.g., of other regions). For example, the cache characteristics management module 346 may be configured to designate a shared region bias value (i.e., with a default value of one) to a portion of the cache block in such embodiments wherein the portion of the cache block has been mapped to the allocated portion of the physical memory designated as the shared region. In some embodiments, the cache characteristics may be stored in the cache characteristics data 306.

The cache eviction management module 348 is configured to manage eviction of data from cache lines of cache memory of the network computing device 106 (e.g., the cache memory 206). To do so, the cache eviction management module 348 is configured to enforce cache eviction policies (i.e., cache replacement algorithms/policies). It should be appreciated that there may be more than one cache eviction policy. For example, the cache eviction policies may include a standard, non-biased eviction policy (e.g., least recently used (LRU), most recently used (MRU), 2-way set associative, direct mapped cache, etc.) and the region-based cache eviction policy as described herein (see, e.g., the method 600 for executing a region-based cache line eviction of FIGS. 6 and 7). In some embodiments, the cache eviction policies and/or information related thereto may be stored in the cache eviction policy data 304.

Accordingly, the cache eviction management module 348 is configured to determine which portion of a cache block in which a cache line selected for eviction corresponds. In other words, the cache eviction management module 348 is configured to determine to which region, if applicable, the cache line corresponds. The cache eviction management module 348 is further configured to retrieve a bias value of the region upon determining the cache line corresponds to a region-based cache management designated region (e.g., a shared region, a relay region, etc.). As described previously, the bias value is usable to determine whether cache lines for the corresponding region are to be evicted upon selection. To do so, the cache eviction management module 348 is configured to generate a bias comparator value, such as by using a biased coin flip simulator, to determine whether or not to evict the cache line selected for eviction (i.e., based on a fractional probability).

The cache eviction management module 348 is further configured to dynamically adjust the bias value, such as may be based on cache hit/miss rates, latency, bandwidth, flows, workloads, etc. It should be appreciated that, under certain conditions, the cache eviction management module 348 may be additionally configured to ignore the bias value. In other words, the cache eviction management module 348 may be configured to enforce the standard, non-biased eviction policy even upon determining the cache line corresponds to a particular region with a corresponding bias value. For example, such conditions may include any condition wherein using the region-based cache eviction policy is likely to result in an undesirably inefficiency, such as, but not limited to cache miss rates exceeding a miss rate threshold, repeated cache line selection for eviction resulting in a cache line being selected for eviction from within the same region as previous attempts in which eviction was denied based on the bias value, the cache line corresponding to a particular workload type, the data corresponding to a particular workload type, etc.

Figure 4:
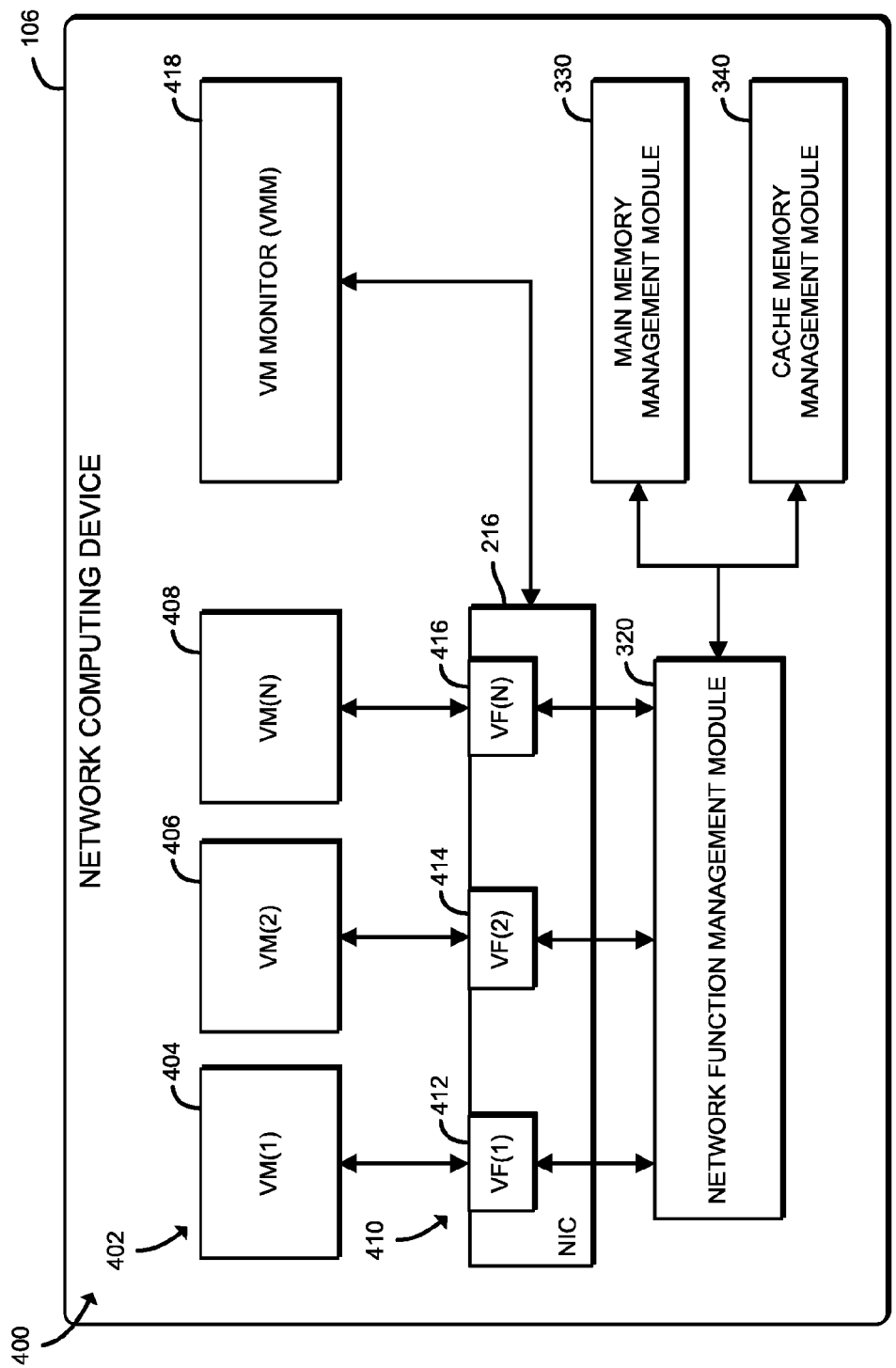
FIG. 4 is a simplified block diagram of another embodiment of an environment that may be established by the network computing device of FIG. 2.

Referring now to FIG. 4, in another illustrative embodiment, the network computing device 106 establishes an environment 400 during operation. The illustrative environment 400 includes a plurality of VMs 402 executed on the network computing device 106, each of which is communicatively coupled to one of a plurality of virtual functions 410 of the NIC 216. In use, the NIC 216 is divided into set of independent virtual functions 410, with each independent virtual functions 410 having its own configuration (e.g., PCI configuration space, media access control (MAC) address, settings, etc.), which may be assigned exclusively to VMs (e.g., the VMs 402) or used by native applications. Further, each of the virtual functions 410 also shares one or more physical resources on the NIC 216, such as an external network port, memory, etc., with the physical functions of the NIC 216.

The illustrative VMs 402 include a first VM, which is designated as VM (1) 404, a second VM, which is designated as VM (2) 406, and a third VM, which is designated as VM (N) 408 (i.e., the "Nth" computing node of the VMs 402, wherein "N" is a positive integer and designates one or more additional VMs 402). The illustrative virtual functions 410 include a first virtual function, which is designated as VF (1) 412, a second virtual function, which is designated as VF (2) 414, and a third virtual function, which is designated as VF (N) 416 (i.e., the "Nth" computing node of the virtual functions 410, wherein "N" is a positive integer and designates one or more additional virtual functions 410). Each of the virtual functions 410 are managed by the NIC 216 and data traffic transmitted therebetween is managed by the network function management module 320 of FIG. 3, described in detail above. It should be appreciated that two or more of the virtual functions 410 are configured to exchange communications via a shared memory (not shown). Accordingly, the network function management module 320 is further coupled to the main memory management module 330 and cache memory management module 340 of FIG. 3, which are also described in detail above, as well as a VM monitor 418 (VMM). The VMM 418 is responsible for controlling and handling of privileged instruction execution. Accordingly, in some embodiments the network function management module 320 may form a portion of the VMM 418, or vice versa.

As described previously, the network computing device 106 may rely on one or more VNFs to perform virtualized network functions utilizing one or more VMs. In some embodiments, such VNFs can be dynamically chained together to form a service function chain (SFC) in a process referred to as service chaining. In a SFC, each service function is performed by one or more VMs spun specifically to perform a particular service function of the SFC. Which service functions are included in a SFC may be tailored to a property associated with a network packet (e.g., payload type, network packet overhead). For example, an administrator of a data center that includes the network computing device 106 may define a SFC comprised of multiple security service functions (e.g., a virtualized firewall function, a virtualized intrusion detection function, etc.), each of which may be configured to process, in a particular order, network packets received by the network computing device 106. While the illustrative environment 400 is depicted using virtualized network functions, the functions described herein may be employed to cover communication exchanges between applications, VMs, VNFs, etc., using shared memory.

In some embodiments, during processing of a network packet, one of the service functions may have resulting data (i.e., resulting from the network packet processing) that is to be passed along to the next service function in the SFC. Accordingly, present cache prioritization technologies, such as DDIO prioritization which applies to simply forwarding network packet data across network functions (e.g., running in VMs, VNFs, native applications, applications executing in containers, etc.) does not apply to transfers of such dynamically altered data. It should be appreciated that the network functions sharing data (e.g., via shared memory buffers) do not share data long-term. In other words, once a sending network function has handed a network packet over (e.g., via IVSHMEM or other buffers in shared memory) to another network function, the sending network function does not refer to the network packet's memory area, except to reuse it once data in it has been consumed by the receiving network function.

It should be further appreciated that other present cache prioritization technologies, such as CAT, do not generally cover the communications via IVSHMEM or circular buffers in shared memory. Further, the data in IVSHMEM or the shared memory buffers typically has a high risk of being evicted due to the cache pressure from processor/memory intensive work within the network functions. For example, CAT solves problems of effective cache division between applications, but does not support buffer usages between network functions. In other words, unlike CAT, region-based cache management can be effective for reserving cache capacity for inter-VM sharing tied to a memory region.

Referring now to FIG. 5, in use, the network computing device 106 may execute a method 500 for configuring region-based cache blocks of the cache memory 206 of the network computing device 106. The method 500 begins in block 502, in which the network computing device 106 determines whether region-based cache management is supported. For example, in some embodiments, the network computing device 106 may rely on CPU identification (CPUID) opcode instructions to determine whether region-based cache management is supported, as well as any capabilities of the region-based cache management that are supported, such as size of cache, granularity of allocation, alignment, memory size supported, etc.). If region-based cache management is supported, the method 500 advances to block 504; otherwise, the method 500 loops back to block 502 to determine whether region-based cache management is supported. In block 504, the network computing device 106 allocates a range of physical memory addresses of the main memory 110 to be associated with a region of cache memory (e.g., via calls through the operating system or VMM 418 of the network computing device 106). For example, in block 506, the network computing device 106 allocates a sequential range of physical memory addresses of the main memory 110 associated with the region in cache.

In block 508, the network computing device 106 associates a block of cache with the allocated range of physical memory addresses (i.e., the allocated portion of main memory 110). It should be appreciated that the size of the cache memory allocated to the range of physical memory addresses may match or may be smaller than that of the associated physical memory range (i.e., a 1:N cache memory mapping ratio, wherein N represents an integer value greater than 1). Accordingly, effects similar to those observed in cache locking paradigms may be obtained if the dynamic footprint of the range is small enough, such as may be useful in SFCs. In block 510, the network computing device 106 divides the allocated portion of main memory 110 into multiple regions. In an illustrative example, the network computing device 106 divides the allocated portion of main memory 110 into a shared region and a relay region, which are both described above. Accordingly, in such an embodiment, an operating system and/or VMM may improve shared structure caching by pushing data to the shared region. Additionally, in such embodiments, storing shared memory (e.g., IVSHMEM) in cache (e.g., in the shared region and/or the relay region) can minimize latency associated with data exchanges. It should be appreciated that the total size of physical memory allocated, the number of regions, etc., may be configured depending on the capabilities of the network computing device 106 (i.e., supported capabilities with regard to region-based cache management).

In block 512, the network computing device 106 maps a corresponding region of the cache block allocated in block 508 to each region of the main memory 110 allocated in block 504. In some embodiments, the cache block may be mapped or otherwise divided with implementation specific granularity (e.g., based on cache ways, cache lines, etc.). Alternatively, in other embodiments, a probabilistic bias may be provided that can be implemented by a hardware-based soft-rationing or randomized technique. In an illustrative example, hardware of the network computing device 106 may map cache lines using round-robin (e.g., via bitmasks for selecting cache ways to be associated with each memory region) or hashing function to distribute physical accesses among the reserved capacity allocation in the cache memory (e.g., rather than static distribution).

In block 514, the network computing device 106 assigns one or more cache characteristics to each region of the mapped cache. For example, in block 516, the network computing device 106 assigns a region indicator to each region of the mapped cached. As described previously, the region indicator may be any type of data structure usable to identify the region of allocated memory. For example, the network computing device 106 may assign a shared region indicator to the shared region of the mapped cache block and a relay region indicator to the relay region of the mapped cache block.

In block 518, the network computing device 106 assigns one or more configuration parameters to each region, such as physical memory address information corresponding to the cache block, start and end physical memory addresses of each region, and/or any other data defining or otherwise guiding cache behavior for each region. As described previously, the configuration parameters may include head and tail indicators, such as may be used in regions configured as circular buffers. In such embodiments, the head indicator effectively points to the oldest datum that is produced and queued for consumption, but has yet to be consumed, and the tail indicator effectively points to the youngest datum that has been produced and queued in the respective region. Accordingly, the range of memory between the head indicator and the tail indicator consists of data that is determined to still be active, while the remaining data (e.g., the range of memory between the tail indicator and the head indicator) may be considered to be stale (e.g., data lingering from old network packets previously processed and dropped/forwarded).

In block 520, the network computing device 106 assigns a bias value (i.e., a fractional probability) to each region. As described previously, the bias value corresponds to a fractional probability having a value between zero and one that is usable to determine whether to evict a cache line that has been selected for eviction, as described below in the method 600 of FIGS. 6 and 7. In some embodiments, in block 522, the cache characteristics (e.g., the region indicators, configuration parameters, bias values, etc.) may be assigned, or otherwise stored, in corresponding MSRs.

Figure 6:
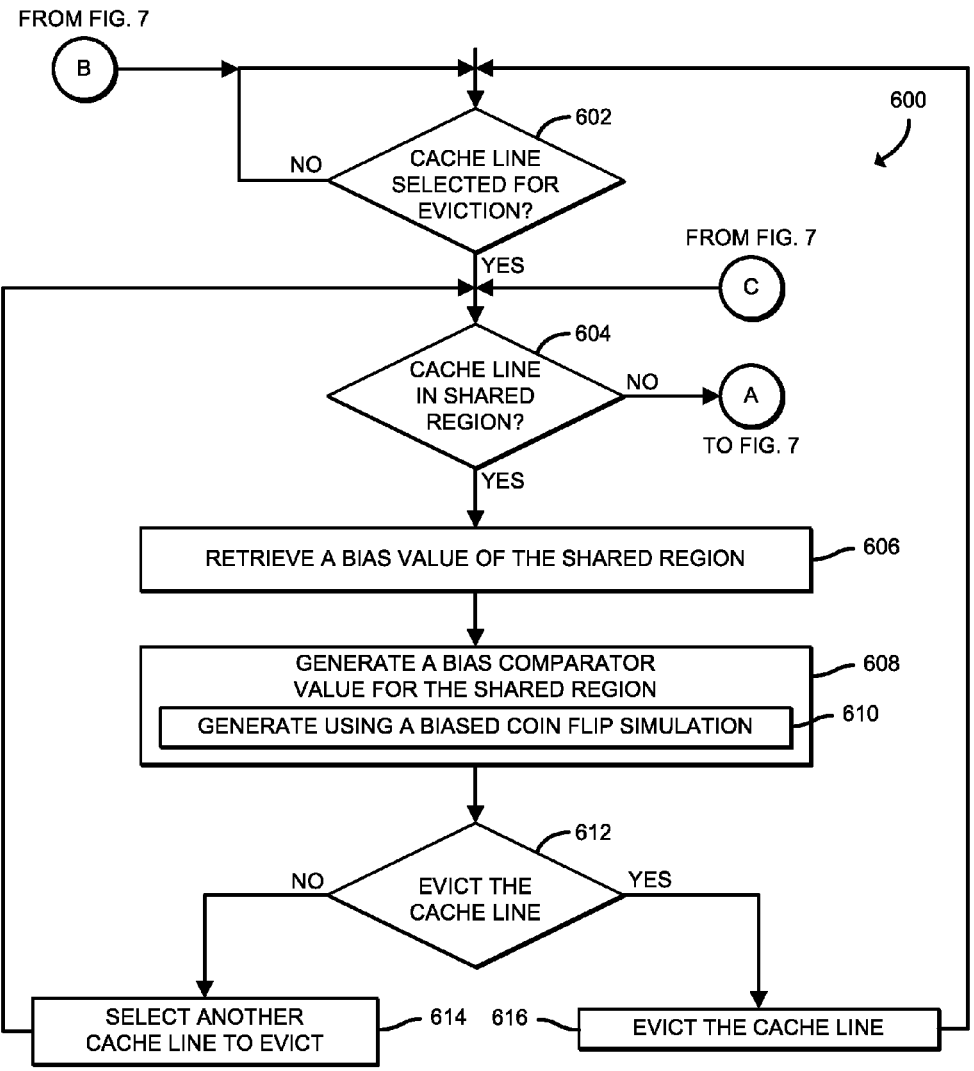
FIGS. 6 and 7 is a simplified flow diagram of at least one embodiment of a method for executing a region-based cache line eviction that may be executed by the network computing device of FIG. 2.
Figure 7:
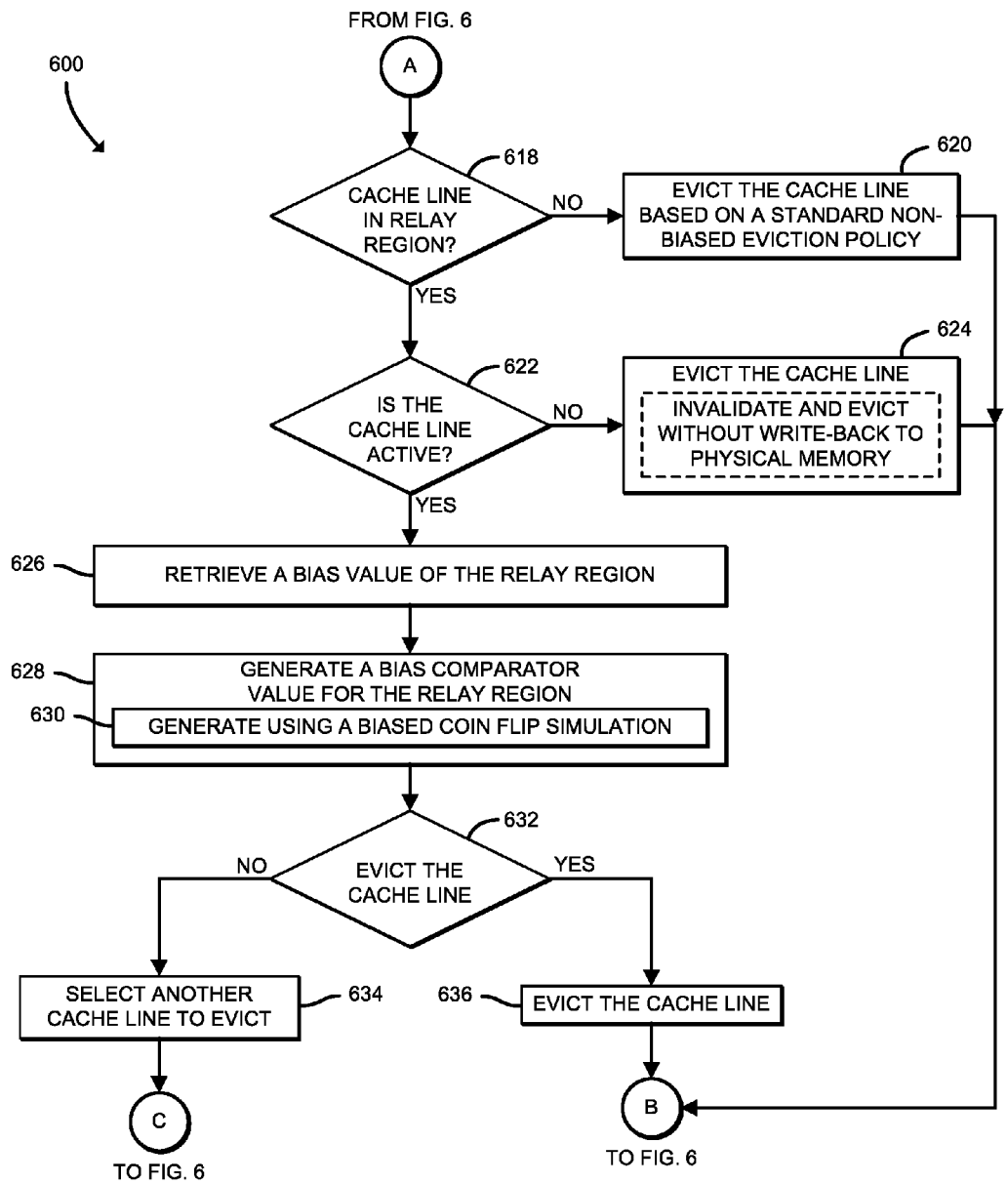

Referring now to FIGS. 6 and 7, in use, the network computing device 106 may execute a method 600 for executing a region-based cache line eviction of a cache line in a cache block of the cache memory 206 of the network computing device 106. The method 600 begins in block 602, in which the network computing device 106 determines whether a cache line has been selected for eviction. If so, the method 600 advances to block 604; otherwise, the method 600 loops back to block 602 to again determine whether a cache line has been selected for eviction. In block 604, the network computing device 106 determines whether the cache line selected for eviction is in a portion of cache memory mapped to a shared region of physical memory (e.g., the main memory 110 of FIG. 1). To do so, as described previously, the network computing device 106 checks for a region indicator (e.g., in an MSR) to determine whether the cache line selected for eviction resides in the shared region.

If the network computing device 106 determines the cache line selected for eviction does not correspond to the shared region, the method 600 branches to block 618 of FIG. 7, described below; otherwise, the method 600 branches to block 606. In block 606, the network computing device 106 retrieves a bias value associated with the shared region (i.e., a shared region bias value) to which the cache line is mapped. As described previously, the bias value corresponds to a fractional probability having a value between zero and one that is usable to determine whether a cache line of a corresponding region selected for eviction is to be evicted, as described below.

In block 608, the network computing device 106 generates a bias comparator value for the shared region (i.e., a shared region bias comparator value). To do so, in block 610, the network computing device 106 uses a biased coin flip simulation to return a probabilistic result (e.g., a result of a biased coin flip simulation). Of course, it should be appreciated that, in other embodiments, the network computing device 106 may utilize other methodologies to generate, or otherwise determine, the bias comparator value (e.g., via a random or pseudo-random value generation method).

In block 612, the network computing device 106 determines whether to evict the cache line. To do so, the network computing device 106 compares the shared region bias comparator value to the shared region bias value. In other words, a result of the biased coin flip simulation is compared to the probabilistic bias value to determine whether to evict the cache line. It should be appreciated that, in some embodiments, the network computing device 106 may be configured to dynamically adjust the shared region bias value based on a result of block 612 (i.e., the outcome of whether the cache line is to be evicted or not).

If the network computing device 106 determines not to evict the cache line, the method 600 branches to block 614, in which the network computing device 106 selects another cache line to evict (e.g., using the cache line eviction policy), before the method 600 returns to block 604 to determine whether the newly selected cache line for eviction is in the shared region. Otherwise, if the network computing device 106 determines to evict the cache line, the method 600 branches to block 616, in which the network computing device 106 evicts the cache line before the method 600 returns to block 602 to wait until another cache line has been selected for eviction.

As described previously, if the network computing device 106 determines the cache line selected for eviction is not in the shared region in block 604, the method 600 branches to block 618. In block 618, the network computing device 106 determines whether the cache line selected for eviction is in a portion of cache memory mapped to a relay region of physical memory (e.g., the main memory 110 of FIG. 1). To do so, similar to block 604, the network computing device 106 checks for a region indicator (e.g., in an MSR) to determine whether the cache line selected for eviction resides in the relay region. If not, the method 600 branches to block 620 in which the cache line is evicted according to the standard non-biased eviction policy before returning to block 602 to determine whether another cache line has been selected for eviction. Otherwise, if the network computing device 106 determines the cache line is in the relay region, the method 600 branches to block 622.

In block 622, the network computing device 106 determines whether the cache line is active, or not stale. To do so, in the illustrative embodiment, the network computing device 106 determines whether the cache line is in an active region of a circular buffer. In other words, the network computing device 106 determines whether the cache line resides in the range of memory between a head indicator and a tail indicator of the circular buffer that contains data determined to still be active. If the network computing device 106 determines the cache line is not active (i.e., stale data residing in a cache line residing within the range of memory between the tail indicator and the head indicator) in block 622, such as from data associated with old network packets previously processed and dropped/forwarded that is still present, the method 600 branches to block 624. In block 624, the network computing device 106 evicts the cache line. In some embodiments, in block 626, the network computing device 106 invalidates the cache line and evicts the cache line without writing back the data to physical memory.

If the network computing device 106 determines the cache line is active in block 622, the method 600 branches to block 626, in which the network computing device 106 retrieves a bias value corresponding to the relay region (i.e., a relay region bias value) to which the cache line is mapped. As described previously, the bias value corresponds to a fractional probability having a value between zero and one.

In block 628, the network computing device 106 generates a bias comparator value for the relay region (i.e., a relay region bias comparator value). To do so, in block 630, the network computing device 106 uses a biased coin flip simulation to return a probabilistic result (e.g., a result of a biased coin flip simulation).

In block 632, the network computing device 106 determines whether to evict the cache line. To do so, the network computing device 106 compares the relay region bias comparator value to the relay region bias value. In other words, a result of the biased coin flip simulation is compared to the probabilistic bias value to determine whether to evict the cache line. It should be appreciated that, in some embodiments, the network computing device 106 may be configured to dynamically adjust the relay region bias value based on a result of block 632 (i.e., the outcome of whether the cache line is to be evicted or not).

If the network computing device 106 determines not to evict the cache line, the method 600 branches to block 634, in which the network computing device 106 selects another cache line to evict (e.g., using the cache line eviction policy) before the method 600 returns to block 604 to determine whether the newly selected cache line for eviction is in the relay region. Otherwise, if the network computing device 106 determines to evict the cache line, the method 600 branches to block 636, in which the network computing device 106 evicts the cache line before the method 600 returns to block 602 to wait until another cache line has been selected for eviction.

It should be appreciated that at least a portion of one or both of the methods 500 and 600 may be executed by the NIC 216 of the network computing device 106. It should be further appreciated that, in some embodiments, one or both of the methods 500 and 600 may be embodied as various instructions stored on a computer-readable media, which may be executed by a processor (e.g., the processor 202, etc.), the NIC 216, and/or other components of the network computing device 106 to cause the network computing device 106 to perform the methods 500 and 600. The computer-readable media may be embodied as any type of media capable of being read by the network computing device 106 including, but not limited to, the main memory 210, the data storage device 212, a secure memory (not shown) of the NIC 216, other memory or data storage devices of the network computing device 106, portable media readable by a peripheral device of the network computing device 106, and/or other media.

EXAMPLES

Illustrative examples of the technologies disclosed herein are provided below. An embodiment of the technologies may include any one or more, and any combination of, the examples described below.

Example 1 includes a network computing device for region-based cache management, the network computing device comprising a processor having a cache memory; a main memory, different from the cache memory, coupled to the processor; and one or more data storage devices having stored therein a plurality of instructions that, when executed by the processor, cause the network computing device to select a cache line for eviction from a plurality of cache lines of the cache memory; determine whether the cache line selected for eviction resides in a cache block of the cache memory that is presently mapped to a corresponding memory region of the main memory, wherein the cache block comprises one or more of the plurality of cache lines; retrieve, in response to a determination that the cache block is mapped to a corresponding memory region, a bias value associated with the corresponding memory region, wherein the bias value corresponds to a fractional probability; generate a bias comparator value for the corresponding memory region; compare the bias value of the corresponding memory region and the bias comparator value generated for the corresponding memory region; and evict the cache line in response to a determination that a result of the comparison indicates to evict the cache line.

Example 2 includes the subject matter of Example 1, and wherein to select the cache line for eviction comprises to select the cache line based on a non-biased cache eviction policy.

Example 3 includes the subject matter of any of Examples 1 and 2, and wherein to generate the bias comparator value comprises to generate the bias comparator value as a function of a biased coin flip simulation.

Example 4 includes the subject matter of any of Examples 1-3, and wherein to determine whether the cache line selected for eviction resides in the cache block mapped to the corresponding memory region comprises to read a model-specific register of the corresponding memory region that includes an indication of the corresponding memory region to which the cache block is mapped.

Example 5 includes the subject matter of any of Examples 1-4, and wherein to determine whether the cache line selected for eviction resides in the cache block mapped to the corresponding memory region comprises to determine whether the corresponding memory region is a shared memory region that is allocated to store data that is to be shared between at least one of a virtualized component or a physical component of the network computing device.

Example 6 includes the subject matter of any of Examples 1-5, and wherein to determine whether the cache line selected for eviction resides in the cache block mapped to the corresponding memory region comprises to determine whether the corresponding memory region is a relay memory region that on is allocated to store transient data communications.

Example 7 includes the subject matter of any of Examples 1-6, and wherein the plurality of instructions further cause the network computing device to allocate a block of main memory, wherein the block of main memory comprises a range of memory addresses of the main memory; associate the cache block with the allocated block of main memory; divide the allocated block of main memory into a plurality of memory regions; map a corresponding portion of the cache block to each of the plurality of memory regions; and assign cache characteristics to each of the plurality of memory regions, wherein the cache characteristics include a region indicator and the bias value.

Example 8 includes the subject matter of any of Examples 1-7, and wherein to allocate the block of main memory comprises to allocate a sequential range of memory addresses of the main memory.

Example 9 includes the subject matter of any of Examples 1-8, and wherein to divide the allocated block of main memory into the plurality of memory regions comprises to divide the allocated block of main memory into a shared region and a relay region, wherein the shared region is allocated to store data that is to be shared between at least one of a virtualized component or a physical component of the network computing device, and wherein the relay region is allocated to store transient data communications.

Example 10 includes the subject matter of any of Examples 1-9, and wherein to assign the region indicator to the shared region comprises to store a shared region indicator in a model-specific register.

Example 11 includes the subject matter of any of Examples 1-10, and wherein to assign the region indicator to the relay region comprises to store a relay region indicator in a model-specific register.

Example 12 includes the subject matter of any of Examples 1-11, and wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

Example 13 includes the subject matter of any of Examples 1-12, and wherein the plurality of instructions further cause the network computing device to adjust the bias value in response to a result of the comparison of the bias value of the corresponding memory region and the bias comparator value generated for the corresponding memory region.

Example 14 includes a network computing device for region-based cache management, the network computing device comprising a processor having a cache memory; and a cache memory management circuit to select a cache line of the cache memory for eviction, wherein the cache line is one of a plurality of cache lines of the cache memory; determine whether the cache line selected for eviction resides in a cache block of the cache memory that is presently mapped to a corresponding memory region of a main memory of the network computing device, wherein the cache block comprises one or more of the plurality of cache lines; retrieve, in response to a determination that the cache block is mapped to a corresponding memory region, a bias value associated with the corresponding memory region, wherein the bias value corresponds to a fractional probability; generate a bias comparator value for the corresponding memory region; compare the bias value of the corresponding memory region and the bias comparator value generated for the corresponding memory region; and evict the cache line in response to a determination that a result of the comparison indicates to evict the cache line.

Example 15 includes the subject matter of Example 14, and wherein to select the cache line for eviction comprises to select the cache line based on a non-biased cache eviction policy.

Example 16 includes the subject matter of any of Examples 14 and 15, and wherein to generate the bias comparator value comprises to generate the bias comparator value as a function of a biased coin flip simulation.

Example 17 includes the subject matter of any of Examples 14-16, and wherein to determine whether the cache line selected for eviction resides in the cache block mapped to the corresponding memory region comprises to read a model-specific register of the corresponding memory region that includes an indication of the corresponding memory region to which the cache block is mapped.

Example 18 includes the subject matter of any of Examples 14-17, and wherein to determine whether the cache line selected for eviction resides in the cache block mapped to the corresponding memory region comprises to determine whether the corresponding memory region is a shared memory region that is allocated to store data that is to be shared between at least one of a virtualized component or a physical component of the network computing device.

Example 19 includes the subject matter of any of Examples 14-18, and wherein to determine whether the cache line selected for eviction resides in the cache block mapped to the corresponding memory region comprises to determine whether the corresponding memory region is a relay memory region that on is allocated to store transient data communications.

Example 20 includes the subject matter of any of Examples 14-19, and further including a main memory management circuit to allocate a block of main memory, wherein the block of main memory comprises a range of memory addresses of the main memory; associate the cache block with the allocated block of main memory; divide the allocated block of main memory into a plurality of memory regions; map a corresponding portion of the cache block to each of the plurality of memory regions; and assign cache characteristics to each of the plurality of memory regions, wherein the cache characteristics include a region indicator and the bias value.

Example 21 includes the subject matter of any of Examples 14-20, and wherein to allocate the block of main memory comprises to allocate a sequential range of memory addresses of the main memory.

Example 22 includes the subject matter of any of Examples 14-21, and wherein to divide the allocated block of main memory into the plurality of memory regions comprises to divide the allocated block of main memory into a shared region and a relay region, wherein the shared region is allocated to store data that is to be shared between at least one of a virtualized component or a physical component of the network computing device, and wherein the relay region is allocated to store transient data communications.

Example 23 includes the subject matter of any of Examples 14-22, and wherein to assign the region indicator to the shared region comprises to store a shared region indicator in a model-specific register.

Example 24 includes the subject matter of any of Examples 14-23, and wherein to assign the region indicator to the relay region comprises to store a relay region indicator in a model-specific register.

Example 25 includes the subject matter of any of Examples 14-24, and wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

Example 26 includes the subject matter of any of Examples 14-25, and wherein the cache memory management circuit is further to adjust the bias value in response to a result of the comparison of the bias value of the corresponding memory region and the bias comparator value generated for the corresponding memory region.

Example 27 a method for region-based cache management, the method comprising selecting, by a network computing device, a cache line for eviction from the plurality of cache lines, wherein the cache line comprises one of a plurality of cache lines of a cache memory residing on a processor of the network computing device; determining, by the network computing device, whether the cache line selected for eviction resides in a cache block of the cache memory that is presently mapped to a corresponding memory region of a main memory of the network computing device externally coupled to the processor, wherein the cache block comprises one or more of the plurality of cache lines; retrieving, by the network computing device and in response to a determination that the cache block is mapped to a corresponding memory region, a bias value associated with the corresponding memory region, wherein the bias value corresponds to a fractional probability; generating, by the network computing device, a bias comparator value for the corresponding memory region; comparing, by the network computing device, the bias value of the corresponding memory region and the bias comparator value generated for the corresponding memory region; and evicting, by the network computing device, the cache line in response to a determination that a result of the comparison indicates to evict the cache line.

Example 28 includes the subject matter of Example 27, and wherein selecting the cache line for eviction comprises selecting the cache line based on a non-biased cache eviction policy.

Example 29 includes the subject matter of any of Examples 27 and 28, and wherein generating the bias comparator value comprises generating the bias comparator value as a function of a biased coin flip simulation.

Example 30 includes the subject matter of any of Examples 27-29, and wherein determining whether the cache line selected for eviction resides in the cache block mapped to the corresponding memory region comprises reading a model-specific register of the corresponding memory region that includes an indication of the corresponding memory region to which the cache block is mapped.

Example 31 includes the subject matter of any of Examples 27-30, and wherein determining whether the cache line selected for eviction resides in the cache block mapped to the corresponding memory region comprises determining whether the corresponding memory region is a shared memory region that is allocated to store data that is to be shared between at least one of a virtualized component or a physical component of the network computing device.

Example 32 includes the subject matter of any of Examples 27-31, and wherein determining whether the cache line selected for eviction resides in the cache block mapped to the corresponding memory region comprises determining whether the corresponding memory region is a relay memory region that on is allocated to store transient data communications.

Example 33 includes the subject matter of any of Examples 27-32, and further including allocating, by the network computing device, a block of main memory, wherein the block of main memory comprises a range of memory addresses of the main memory; associating, by the network computing device, the cache block with the allocated block of main memory; dividing, by the network computing device, the allocated block of main memory into a plurality of memory regions; mapping, by the network computing device, a corresponding portion of the cache block to each of the plurality of memory regions; and assigning, by the network computing device, cache characteristics to each of the plurality of memory regions, wherein the cache characteristics include a region indicator and the bias value.

Example 34 includes the subject matter of any of Examples 27-33, and wherein allocating the block of main memory comprises allocating a sequential range of memory addresses of the main memory.

Example 35 includes the subject matter of any of Examples 27-34, and wherein dividing the allocated block of main memory into the plurality of memory regions comprises dividing the allocated block of main memory into a shared region and a relay region, wherein the shared region is allocated to store data that is to be shared between at least one of a virtualized component or a physical component of the network computing device, and wherein the relay region is allocated to store transient data communications.

Example 36 includes the subject matter of any of Examples 27-35, and wherein assigning the region indicator to the shared region comprises storing a shared region indicator in a model-specific register.

Example 37 includes the subject matter of any of Examples 27-36, and wherein assigning the region indicator to the relay region comprises storing a relay region indicator in a model-specific register.

Example 38 includes the subject matter of any of Examples 27-37, and wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

Example 39 includes the subject matter of any of Examples 27-38, and further including adjusting, by the network computing device, the bias value in response to a result of the comparison of the bias value of the corresponding memory region and the bias comparator value generated for the corresponding memory region.

Example 40 includes a network computing device comprising a processor; and a memory having stored therein a plurality of instructions that when executed by the processor cause the network computing device to perform the method of any of Examples 27-39.

Example 41 includes one or more machine readable storage media comprising a plurality of instructions stored thereon that in response to being executed result in a network computing device performing the method of any of Examples 27-39.

Example 42 includes a network computing device for region-based cache management, the network computing device comprising means for selecting a cache line for eviction from the plurality of cache lines, wherein the cache line comprises one of a plurality of cache lines of a cache memory residing on a processor of the network computing device; means for determining whether the cache line selected for eviction resides in a cache block of the cache memory that is presently mapped to a corresponding memory region of a main memory of the network computing device externally coupled to the processor, wherein the cache block comprises one or more of the plurality of cache lines; means for retrieving, in response to a determination that the cache block is mapped to a corresponding memory region, a bias value associated with the corresponding memory region, wherein the bias value corresponds to a fractional probability; means for generating a bias comparator value for the corresponding memory region; means for comparing the bias value of the corresponding memory region and the bias comparator value generated for the corresponding memory region; and means for evicting the cache line in response to a determination that a result of the comparison indicates to evict the cache line.

Example 43 includes the subject matter of Example 42, and wherein the means for selecting the cache line for eviction comprises means for selecting the cache line based on a non-biased cache eviction policy.

Example 44 includes the subject matter of any of Examples 42 and 43, and wherein the means for generating the bias comparator value comprises means for generating the bias comparator value as a function of a biased coin flip simulation.

Example 45 includes the subject matter of any of Examples 42-44, and wherein the means for determining whether the cache line selected for eviction resides in the cache block mapped to the corresponding memory region comprises means for reading a model-specific register of the corresponding memory region that includes an indication of the corresponding memory region to which the cache block is mapped.

Example 46 includes the subject matter of any of Examples 42-45, and, wherein the means for determining whether the cache line selected for eviction resides in the cache block mapped to the corresponding memory region comprises means for determining whether the corresponding memory region is a shared memory region that is allocated to store data that is to be shared between at least one of a virtualized component or a physical component of the network computing device.

Example 47 includes the subject matter of any of Examples 42-46, and wherein the means for determining whether the cache line selected for eviction resides in the cache block mapped to the corresponding memory region comprises means for determining whether the corresponding memory region is a relay memory region that on is allocated to store transient data communications.

Example 48 includes the subject matter of any of Examples 42-47, and further including a main memory management circuit to (i) allocate a block of main memory, wherein the block of main memory comprises a range of memory addresses of the main memory and (ii) associate the cache block with the allocated block of main memory; means for dividing the allocated block of main memory into a plurality of memory regions; means for mapping a corresponding portion of the cache block to each of the plurality of memory regions; and means for assigning cache characteristics to each of the plurality of memory regions, wherein the cache characteristics include a region indicator and the bias value.

Example 49 includes the subject matter of any of Examples 42-48, and wherein to allocate the block of main memory comprises to allocate a sequential range of memory addresses of the main memory.

Example 50 includes the subject matter of any of Examples 42-49, and wherein the means for dividing the allocated block of main memory into the plurality of memory regions comprises means for dividing the allocated block of main memory into a shared region and a relay region, wherein the shared region is allocated to store data that is to be shared between at least one of a virtualized component or a physical component of the network computing device, and wherein the relay region is allocated to store transient data communications.

Example 51 includes the subject matter of any of Examples 42-50, and wherein the means for assigning the region indicator to the shared region comprises means for storing a shared region indicator in a model-specific register.

Example 52 includes the subject matter of any of Examples 42-51, and wherein the means for assigning the region indicator to the relay region comprises means for storing a relay region indicator in a model-specific register.

Example 53 includes the subject matter of any of Examples 42-52, and wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

Example 54 includes the subject matter of any of Examples 42-53, and further including means for adjusting the bias value in response to a result of the comparison of the bias value of the corresponding memory region and the bias comparator value generated for the corresponding memory region.

The invention claimed is:

1. A network computing device for region-based cache management, the network computing device comprising:
   a processor having a cache memory;
   a main memory externally coupled to the processor; and
   one or more data storage devices having stored therein a plurality of instructions that, when executed by the processor, cause the network computing device to:
   select a cache line for eviction from a plurality of cache lines of the cache memory;
   determine whether the cache line selected for eviction resides in a cache block of the cache memory that is presently mapped to a corresponding memory region of the main memory, wherein the cache block comprises one or more of the plurality of cache lines;
   retrieve, in response to a determination that the cache block is mapped to a corresponding memory region, a bias value associated with the corresponding memory region, wherein the bias value corresponds to a fractional probability;
   generate a bias comparator value for the corresponding memory region;
   compare the bias value of the corresponding memory region and the bias comparator value generated for the corresponding memory region; and
   evict the cache line in response to a determination that a result of the comparison indicates to evict the cache line.

2. The network computing device of claim 1, wherein to generate the bias comparator value comprises to generate the bias comparator value as a function of a biased coin flip simulation.

3. The network computing device of claim 1, wherein to determine whether the cache line selected for eviction resides in the cache block mapped to the corresponding memory region comprises to read a model-specific register of the corresponding memory region that includes an indication of the corresponding memory region to which the cache block is mapped.

4. The network computing device of claim 1, wherein the plurality of instructions further cause the network computing device to:
   allocate a block of main memory, wherein the block of main memory comprises a range of memory addresses of the main memory;
   associate the cache block with the allocated block of main memory;
   divide the allocated block of main memory into a plurality of memory regions;
   map a corresponding portion of the cache block to each of the plurality of memory regions; and
   assign cache characteristics to each of the plurality of memory regions, wherein the cache characteristics include a region indicator and the bias value.

5. The network computing device of claim 4, wherein to allocate the block of main memory comprises to allocate a sequential range of memory addresses of the main memory.

6. The network computing device of claim 4, wherein to divide the allocated block of main memory into the plurality of memory regions comprises to divide the allocated block of main memory into a shared region and a relay region, wherein the shared region is allocated to store data to be shared between at least one of a virtualized component or a physical component of the network computing device, and wherein the relay region is allocated to store transient data communications.

7. The network computing device of claim 6, wherein to assign the region indicator to the shared region comprises to store a shared region indicator in a model-specific register, and wherein to assign the region indicator to the relay region comprises to store a relay region indicator in a model-specific register.

8. The network computing device of claim 6, wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

9. The network computing device of claim 1, wherein the plurality of instructions further cause the network computing device to adjust the bias value in response to a result of the comparison of the bias value of the corresponding memory region and the bias comparator value generated for the corresponding memory region.

10. One or more non-transitory, computer-readable storage media comprising a plurality of instructions stored thereon that in response to being executed cause a network computing device to:
 select a cache line of a cache memory for eviction, wherein the cache line is one of a plurality of cache lines of the cache memory of the network computing device;
 determine whether the cache line selected for eviction resides in a cache block of the cache memory that is presently mapped to a corresponding memory region of a main memory of the network computing device, wherein the cache block comprises one or more of the plurality of cache lines;
 retrieve, in response to a determination that the cache block is mapped to a corresponding memory region, a bias value associated with the corresponding memory region, wherein the bias value corresponds to a fractional probability;
 generate a bias comparator value for the corresponding memory region;
 compare the bias value of the corresponding memory region and the bias comparator value generated for the corresponding memory region; and
 evict the cache line in response to a determination that a result of the comparison indicates to evict the cache line.

11. The one or more non-transitory, computer-readable storage media of claim 10, wherein to generate the bias comparator value comprises to generate the bias comparator value as a function of a biased coin flip simulation.

12. The one or more non-transitory, computer-readable storage media of claim 10, wherein to determine whether the cache line selected for eviction resides in the cache block mapped to the corresponding memory region comprises to read a model-specific register of the corresponding memory region that includes an indication of the corresponding memory region to which the cache block is mapped.

13. The one or more non-transitory, computer-readable storage media of claim 10, wherein the plurality of instructions further cause the network computing device to:
 allocate a block of main memory, wherein the block of main memory comprises a range of memory addresses of the main memory;
 associate the cache block with the allocated block of main memory;
 divide the allocated block of main memory into a plurality of memory regions;
 map a corresponding portion of the cache block to each of the plurality of memory regions; and
 assign cache characteristics to each of the plurality of memory regions, wherein the cache characteristics include a region indicator and the bias value.

14. The one or more non-transitory, computer-readable storage media of claim 13, wherein to allocate the block of main memory comprises to allocate a sequential range of memory addresses of the main memory.

15. The one or more non-transitory, computer-readable storage media of claim 13, wherein to divide the allocated block of main memory into the plurality of memory regions comprises to divide the allocated block of main memory into a shared region and a relay region, wherein the shared region is allocated to store data to be shared between at least one of a virtualized component or a physical component of the network computing device, and wherein the relay region is allocated to store transient data communications.

16. The one or more non-transitory, computer-readable storage media of claim 15, wherein to assign the region indicator to the shared region comprises to store a shared region indicator in a model-specific register, and wherein to assign the region indicator to the relay region comprises to store a relay region indicator in a model-specific register.

17. The one or more non-transitory, computer-readable storage media of claim 15, wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

18. The one or more non-transitory, computer-readable storage media of claim 10, wherein the plurality of instructions further cause the network computing device to adjust the bias value in response to a result of the comparison of the bias value of the corresponding memory region and the bias comparator value generated for the corresponding memory region.

19. A method for region-based cache management, the method comprising:
 selecting, by a network computing device, a cache line for eviction from the plurality of cache lines, wherein the cache line comprises one of a plurality of cache lines of a cache memory residing on a processor of the network computing device;
 determining, by the network computing device, whether the cache line selected for eviction resides in a cache block of the cache memory that is presently mapped to a corresponding memory region of a main memory of the network computing device externally coupled to the processor, wherein the cache block comprises one or more of the plurality of cache lines;
 retrieving, by the network computing device and in response to a determination that the cache block is mapped to a corresponding memory region, a bias value associated with the corresponding memory region, wherein the bias value corresponds to a fractional probability;

generating, by the network computing device, a bias comparator value for the corresponding memory region;

comparing, by the network computing device, the bias value of the corresponding memory region and the bias comparator value generated for the corresponding memory region; and evicting, by the network computing device, the cache line in response to a determination that a result of the comparison indicates to evict the cache line.

20. The method of claim 19, wherein generating the bias comparator value comprises generating the bias comparator value as a function of a biased coin flip simulation.

21. The method of claim 19, wherein determining whether the cache line selected for eviction resides in the cache block mapped to the corresponding memory region comprises reading a model-specific register of the corresponding memory region that includes an indication of the corresponding memory region to which the cache block is mapped.

22. The method of claim 19, further comprising:
allocating, by the network computing device, a block of main memory, wherein the block of main memory comprises a range of memory addresses of the main memory;
associating, by the network computing device, the cache block with the allocated block of main memory;
dividing, by the network computing device, the allocated block of main memory into a plurality of memory regions;
mapping, by the network computing device, a corresponding portion of the cache block to each of the plurality of memory regions; and
assigning, by the network computing device, cache characteristics to each of the plurality of memory regions, wherein the cache characteristics include a region indicator and the bias value.

23. The method of claim 22, wherein allocating the block of main memory comprises allocating a sequential range of memory addresses of the main memory.

24. The method of claim 22, wherein dividing the allocated block of main memory into the plurality of memory regions comprises dividing the allocated block of main memory into a shared region and a relay region, wherein the shared region is allocated to store data to be shared between at least one of a virtualized component or a physical component of the network computing device, and wherein the relay region is allocated to store transient data communications.

25. The method of claim 24, wherein assigning the region indicator to the shared region comprises storing a shared region indicator in a model-specific register, and wherein assigning the region indicator to the relay region comprises storing a relay region indicator in a model-specific register.

26. The method of claim 24, wherein the corresponding portion of cache memory mapped to the shared region comprises a circular buffer, wherein the cache characteristics additionally include one or more configuration parameters, and wherein the configuration parameters include a head indicator of the shared region and a tail indicator of the shared region.

27. The method of claim 19, further comprising adjusting, by the network computing device, the bias value in response to a result of the comparison of the bias value of the corresponding memory region and the bias comparator value generated for the corresponding memory region.

28. A network computing device for region-based cache management, the network computing device comprising:
a cache memory management circuit to select a cache line for eviction from the plurality of cache lines, wherein the cache line comprises one of a plurality of cache lines of a cache memory residing on a processor of the network computing device;
means for determining whether the cache line selected for eviction resides in a cache block of the cache memory that is presently mapped to a corresponding memory region of a main memory of the network computing device coupled to the processor, wherein the cache block comprises one or more of the plurality of cache lines;
means for retrieving, in response to a determination that the cache block is mapped to a corresponding memory region, a bias value associated with the corresponding memory region, wherein the bias value corresponds to a fractional probability;
means for generating a bias comparator value for the corresponding memory region; and
means for comparing the bias value of the corresponding memory region and the bias comparator value generated for the corresponding memory region,
wherein the cache memory management circuit is further to evict the cache line in response to a determination that a result of the comparison indicates to evict the cache line.

29. The network computing device of claim 28, further comprising:
a main memory management circuit to (i) allocate a block of main memory, wherein the block of main memory comprises a range of memory addresses of the main memory and (ii) associate the cache block with the allocated block of main memory;
means for dividing the allocated block of main memory into a plurality of memory regions;
means for mapping a corresponding portion of the cache block to each of the plurality of memory regions; and
means for assigning cache characteristics to each of the plurality of memory regions, wherein the cache characteristics include a region indicator and the bias value.

30. The network computing device of claim 28, further comprising means for adjusting the bias value in response to a result of the comparison of the bias value of the corresponding memory region and the bias comparator value generated for the corresponding memory region.

* * * * *